United States Patent
Kim et al.

(10) Patent No.: US 8,017,676 B2
(45) Date of Patent: Sep. 13, 2011

(54) HALOGEN-FREE FLAME RETARDANT THERMOPLASTIC POLYURETHANES

(75) Inventors: Young Woo Kim, Incheon (KR); Hwa Yong Lee, Gyeonggi-do (KR); Tae Woong Lee, Gyeonggi-do (KR); Dong Sik Kim, Seoul (KR)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 182 days.

(21) Appl. No.: 12/339,117

(22) Filed: Dec. 19, 2008
(Under 37 CFR 1.47)

(65) Prior Publication Data
US 2009/0326108 A1    Dec. 31, 2009

(51) Int. Cl.
*C08K 5/3492* (2006.01)
*C08K 5/05* (2006.01)
*C08K 5/51* (2006.01)
*C08K 5/53* (2006.01)
*C08K 3/34* (2006.01)

(52) U.S. Cl. ........ 524/100; 524/126; 524/139; 524/387; 524/451

(58) Field of Classification Search .................. 524/100, 524/126, 387, 451, 139
See application file for complete search history.

(56) References Cited

U.S. PATENT DOCUMENTS

| | | | |
|---|---|---|---|
| 3,810,862 A | 5/1974 | Mathis et al. | |
| 4,413,101 A | 11/1983 | Schmidt et al. | |
| 4,542,170 A | 9/1985 | Hall et al. | |
| 5,110,850 A | 5/1992 | Farkas | |
| 6,905,693 B2 * | 6/2005 | Chyall et al. | 424/400 |
| 2005/0272839 A1 | 12/2005 | Bauer et al. | |
| 2008/0167408 A1 * | 7/2008 | Siddhamalli et al. | 524/133 |

FOREIGN PATENT DOCUMENTS

| | | |
|---|---|---|
| EP | 0 617 079 A2 | 9/1994 |
| EP | 1 602 685 A1 | 12/2005 |
| WO | 2006/121549 A1 | 11/2006 |

* cited by examiner

*Primary Examiner* — Kriellion A Sanders
(74) *Attorney, Agent, or Firm* — Joe A. Powell; Teresan W. Gilbert

(57) ABSTRACT

Disclosed is a halogen-free flame retardant thermoplastic polyurethane composite resin composition. The disclosed flame retardant thermoplastic polyurethane composite resin composition is capable of improving flame retardancy and flaming-drip of a thermoplastic polyurethane resin through desirable formation of char during combustion, which uses a phosphinate, a diphosphinate and/or a polymer thereof, dipentaerythritol, talc, a melamine derivative, etc., instead of a halogen-based flame retardant, as a flame retardant.

11 Claims, No Drawings

HALOGEN-FREE FLAME RETARDANT THERMOPLASTIC POLYURETHANES

CROSS REFERENCE TO RELATED APPLICATION

This application claims the benefit of priority of Korean Patent Application Serial No. 2007-0135402 filed on Dec. 21, 2007.

BACKGROUND OF THE INVENTION

1. Field of the Invention

The present invention relates to a halogen-free flame retardant thermoplastic polyurethane composite resin composition. More particularly, the present invention relates to a flame retardant thermoplastic polyurethane composite resin composition capable of improving flame retardancy and flaming-drip of a thermoplastic polyurethane resin through desirable formation of char during combustion, which uses a phosphinate, a diphosphinate and/or a polymer thereof, dipentaerythritol, talc, a melamine derivative, etc., instead of a halogen-based flame retardant, as a flame retardant.

2. Description of the Prior Art

In general, a thermoplastic polyurethane resin, which has an excellent mechanical property (such as high abrasion resistance) and a high elastic force, can be used for producing products through processes such as injection-molding, extrusion-molding, etc., unlike a conventional thermosetting resin (that is, an elastomer such as cross-linked rubber), and also due to its excellent formability, has been used in various industrial fields, such as cars, electric wires, pneumatic hoses, shoes, etc. However, a thermoplastic polyurethane resin has weak flame resistance, and thereby its use has been restricted in certain fields requiring high flame resistance. Accordingly, methods of providing flame resistance to such a thermoplastic polyurethane resin have been developed, and especially, some methods of adding a flame resistant to a resin have been mainly used. Since the addition of a flame retardant may reduce physical properties of a thermoplastic polyurethane resin, such as elongation at break, a resilient elastic force, elastic modulus, abrasion, etc., it is preferable to add the flame retardant to the resin in as small an amount as possible so as to minimize the reduction. Also, the thermoplastic polyurethane resin is decomposed into a low molecular weight molten material through combustion, thereby causing flaming-drip. In this case, if a fire occurs, the flaming-drip may spread the fire. Therefore, improvement of the occurrence of flaming-drip during combustion is one of many important things to be taken into account in developing a thermoplastic polyurethane resin.

One method of improving flame retardancy of a thermoplastic polyurethane resin is to use a halogen-based flame retardant either alone or in combination with a metal oxide compound, such as antimony oxide, etc. However, it is difficult to apply such a resin using the halogen-based flame retardant to a certain use due to its smoke (caused by combustion) and corrosion. Therefore, in order to solve such problems caused by using the halogen-based flame retardant, research and development on a flame retardant thermoplastic polyurethane resin using a halogen-free flame retardant have been recently conducted.

For example, U.S. Pat. No. 4,413,101 disclosed a thermoplastic polyurethane resin using a high molecular weight resin including polyarylphosphonate and polyarylphosphonatocarbonate as a flame retardant in an amount of 20 to 40 parts by weight, in which an oxygen index is increased thereby increasing flame retardancy. However, herein, physical properties and flaming-drip were not included.

Meanwhile, U.S. Pat. No. 4,542,170 disclosed improvement of flame retardancy and flaming-drip of a thermoplastic polyurethane resin by using pentate salts of amino-s-triazine, and nitrogen containing phosphates (such as amine phosphate, ammonium phosphate, and ammonium polyphosphate), as a flame retardant However, it was found that this method results in significant reduction of a mechanical property such as tensile strength.

Also, U.S. Pat. No. 5,110,850 disclosed a flame retardant thermoplastic polyurethane resin using only melamine as a flame retardant, in which flame retardancy is improved and thus meets the UL (Underwriter's laboratory) rating UL 94VO. However, in this method, flaming-drip was not included.

Therefore, it is required to prepare a flame ret t thermoplastic polyurethane resin capable of improving flaming-drip and flame retardancy and maintaining a mechanical property. Additionally, requirements for a resin having more improved flame retardancy have been increased.

SUMMARY OF THE INVENTION

Accordingly, in order to solve the above-mentioned problems occurring in the prior art the inventors of the present invention have developed a flame retardant thermoplastic polyurethane composition by adding a phosphinate, a diphosphinate and/or a polymer thereof dipentaerythritol, talc, a melainine derivative, etc., instead of a halogen-based flame retardant, as a flame retardant, to a thermoplastic polyurethane resin. The flame retardant thermoplastic polyurethane composition has a self-extinguishing property, flame retardancy (higher than conventional compositions), and improved flaming-drip.

Accordingly, the present invention has been made to provide a flame retardant thermoplastic polyurethane resin composition, which is highly self-extinguishable during combustion and can improve flame retardancy and flaming-drip.

In accordance with an aspect of the present invention, there is provided a flame retardant thermoplastic polyurethane resin composition including: 35 to 85 percent by weight of thermoplastic polyurethane resin having an equivalent ratio of a diisocyanate to an alcohol group included in diol and polyol in a range from 0.95 to 1.10; 0.5 to 15 percent by weight of organic phosphorous flame retardant; 0.5 to 10 percent by weight of dipentaerythritol; 0.5 to 5 percent by weight of talc; and 5 to 35 percent by weight of melamine derivative.

The halogen-free flame retardant thermoplastic polyurethane composite resin composition according to the present invention is environmentally friendly due to its improved flame retardancy and improved flaming-drip. Thus, the polyurethane resin composition is expected to be very useful for a wire insulator, car interior materials, etc.

DETAILED DESCRIPTION OF THE EXEMPLARY EMBODIMENTS

Hereinafter, the present invention will be described in detail.

The present invention relates to a flame retardant thermoplastic polyurethane composite resin composition capable of solving problems of flame retardancy and flaming-drip of a thermoplastic polyurethane resin through desirable formation of char during combustion, in which halogen-free flame retardant is used with the thermoplastic polyurethane resin.

A thermoplastic polyurethane resin used in the present invention includes a hard segment and a soft segment. The hard segment is derived by a reaction of diisocyanate with a diol of a chain extender. The soft segment is derived by reaction of a polyol with diisocyanate, and the characteristic thereof depends on the kind of the polyol.

The diisocyanate may be selected singly or in combination from the group including aromatic diisocyanate, aliphatic diisocyanate and cyclic aliphatic diisocyanate. The aromatic diisocyanate may include 1,4-phenylenediisocyanate; 2,4toluenediisocyanate, 2,6-toluenediisocyanate, or a mixture thereof; 2,2-methylenediphenylenediisocyanate, 2,4'-methylenediphenylenediisocyanate, or 4,4'-methylenediphenylenediisocyanate; and naphthalene diisocyanate. The aliphatic diisocyanate or cyclic aliphatic diisocyanate may include cyclohexane diisocyanate, hexamethylene diisocyanate, isophorone diisocyanate, etc.

The diol used as the chain extender may be used singly or in combination from the group including ethylene glycol, diethylene glycol, propylene glycol, dipropylene glycol, 1,3-butanediol, 1,4butanediol, 2-methylpentanediol, 1,5-pentanediol, 1,6-hexanediol, 1,4-cyclohexanediol, 1,4-cyclohexanedimethanol and neopentyl glycol.

The polyol may include polyester polyol, polyether polyol, etc. The polyester polyol is prepared by reacting at least one kind of dicarboxylic acid with at least one kind of diol. The dicarboxylic acid includes adipic acid, sebacic acid, suberic acid, methyladipic acid, glutaric acid, azelaic acid, etc., and the diol includes ethylene glycol, 1,3- or 1,2-propylene glycol, 1,4-butanediol, 2-methylpentanediol, 1,5-pentanediol, 1,6hexanediol, etc. Also, cyclic carbonate, etc., such as ε-caprolactone, may be used for preparing polyester polyol. Especially, mainly used polyester polyol is poly(ethylene adipate), poly(1,4butylene adipate), or a mixture thereof, and also poly (ε-caprolactone) is mainly used.

The polyether polyol is obtained by additional polymerization of alylene oxide. Alkylene oxide that may be used in the present invention includes ethylene oxide, propylene oxide, butylene oxide, tetrahydrofuran, etc. Especially, mainly used polyether polyol includes poly (propylene oxide)glycol, poly (tetramethylene ether)glycol, or a mixture thereof The polyol for the soft segment of thermoplastic polyurethane preferably has a molecular weight of 500 to 8000, and more preferably has a molecular weight of 800 to 5000.

In general, the catalyst used as the thermoplastic polyurethane resin may be a tertiary amine-based catalyst or an organometallic compound. The tertiary amine-based catalyst may be selected from the group including triethylamine, dimethylcyclohexylaimine, N-methylmorpholine, N,N'-dimethylpiperazine, 2-(dimethylaminoethoxy)ethanol and diazabicyclo(2,2,2)octane, etc., and the organometallic compound may be selected from the group including tin diacetate, tin dioctoate, tin dilaurate and dibutyltin dilaurate, etc. Preferably, the organometallic compound may be used alone or in mixture of two kinds or more thereof.

In preparing a thermoplastic polyurethane resin, an equivalent ratio of a diisocyanate group (NCO) to an alcohol group, (that is, based on the alcohol group (OH) included in diol and polyol used for preparing the thermoplastic polyurethane resin) preferably ranges from 0.95 to 1.10, more preferably ranges from 0.96 to. 1.05, and most preferably ranges from 0.97 to 1.03.

If the equivalent ratio is less than 0.95, a molecular weight of the resin is low, thereby reducing basic physical properties. On the other hand, an equivalent ratio greater than 1.10 also causes the same problem.

Polymerization of the thermoplastic polyurethane resin may be carried out by a method using a batch reactor or a continuous reaction extruder. In the method using the batch reactor, a reactant is introduced into a reactor and is subjected to a reaction to some extent and then is discharged, followed by further heat-treatment. Meanwhile, in the method using the continuous reaction extruder, a raw material is fed to an extruder through a measuring unit from a raw material storing tank, and then the reaction is completed at the extruder. The method using the continuous reaction extruder is preferable as compared to the method using the batch reactor because the method makes it possible to achieve better quality uniformity of products due to uniform heat transfer.

In preparing the thermoplastic polyurethane resin by using the continuous reaction extruder, temperature of the extruder preferably ranges from 150 to 250° C., and more preferably ranges from 170 to 210° C.

In the present invention, the thermoplastic polyurethane resin is preferably used in an amount of 35 to 80 percent by weight, more preferably of 50 to 70 percent by weight. If the content is less than 35 percent by weight, a mechanical property of a flame retardant thermoplastic resin composition is reduced, and on the other hand, if the content is grater than 80 percent by weight, it is impossible to sufficiently achieve flame retardancy.

Also, in order to obtain a flame retardant polyurethane resin composition according to the present invention, which has preferable physical properties and processibility, it is preferable that a thermoplastic polyurethane resin used for melt-kneading has a molecular weight of 100,000 to 700,000, and more preferably of 200,000 to 500,000. The mentioned molecular weight is an average molecular weight measured by GPC (Gel Permeation Chromatography).

In general, it is known that a phosphorous flame retardant interrupts decomposition in a condensed phase and increases a char yield during combustion, while providing flame retardancy to a resin, and especially, is very effective for a resin containing high oxygen content, such as cellulose or a thermoplastic polyurethane resin. A layer including a carbonized resin, which is caused by combustion, represents char. The formation of char prevents a resin from contacting with decomposed resin gas, thereby inhibiting the spread of fire. Such a phosphorous flame retardant generates metaphosphoric acid, polymetaphosphoric acid, etc. by pyrolysis during combustion, and has very high flame retaadancy due to protective layer formed by a phosphoric acid layer, and the char generated by dehydration of polymetaphosphoric acid. Thus, the phosphorous flame retardant is used for various kinds of resins. An organic phosphorous flame retardant that may be used in the present invention may be one or two or more compounds selected from the group including a phosphinate, a diphosphinate and a polymer thereof, and more specifically may be represented by following Formulas.

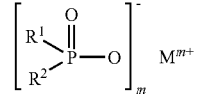

[Formula 1]

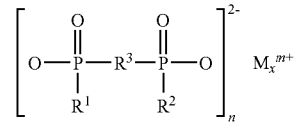

[Formula 2]

An organic phosphorous flame retardant according to the present invention includes a phosphinate represented by Formula 1, a diphosphinate represented by Formula 2, and/or a polymer thereof In the Formulas 1 and 2, $R^1$, and $R^2$ represents C1 to C6 allyl, for example, methyl, ethyl, n-propyl, isopropyl, n-butyl, t-butyl, n-pentyl, or phenyl, and M represents calcium, aluminum or zinc. $R^3$ represents linear or branched chain C1 to C10 alkylene (for example: methylene, ethylene, n-propylene, isopropylene, n-butylene, tertiary butylenes, n-pentylene, n-octylene, n-dodecylene), C6 to C10 arylene (for example, phenylene or naphthylene), C6 to C10 alkyarylene (for example: methylphenylene, ethylphenylene, tertiary butylphenylene, methylnaphthylene, ethylnaphthylene, tertiary butylnaphthylene) or C6 to C10 arylalkylene (for example: phenylmethylene, phenylethylene, phenylpropylene or phenylbutylene); m represents 2 or 3; n represents 1 or 3; and x represents 1 or 2.

Most preferably, as the organic phosphorous flame retardant, Exolit OP is used. It is possible to achieve high flame retardancy by using only a small amount of this phosphorous flame retardant. The addition of the phosphorous flame retardant in a small amount may minimize reduction of physical properties of a resin while being effective in char formation. Also, dipentaerythritol ($C_{10}H_{22}O_7$) is capable of reinforcing flame retardancy because it is effective in char formation, and thus can expand up to about 200 times its original volume. However, there is a limitation that a thermoplastic polyurethane composition prepared by using only a phosphinate, a diphosphinate and a polymer thereof, and dipentaerythritol has sufficient flame retardancy.

Therefore, in the present invention, in order to improve flaming-drip during combustion, a melamine-based flame retardant, such as a melamine derivative, is mixed with a phosphinate, a diphosphinate and a polymer thereof, and dipentaerythritol. It is known that the melamine-based flame retardant is less toxic, is easy to treat, and generates little toxic gas, as compared to a halogen-based flame retardant, and thus is not harmful to human health and the environment. As the melamine-based flame retardant, melamine cyanurate, melamine phosphate, melamine polyphosphate, melamine borate, etc. are mainly used. However, like the phosphorous flame retardant, the use of the melamine-based flame retardant alone for a thermoplastic polyurethane resin makes it possible to achieve flame retardancy to some extent while causing flaming-drip. This results in limitation in obtaining a thermoplastic polyurethane resin having sufficient flame retardancy.

As described above, when each of one or two or more organic phosphorous flame retardants selected from the group including a phosphinate, a diphosphinate and a polymer thereof, dipentaerythritol, and a melamine-based flame retardant is independently used as a flame retardant for a thermoplastic polyurethane resin, it is not easy to obtain a flame retardant thermoplastic polyurethane composite resin composition having a sufficient self-extinguishing property and no flaming-drip. However, a mixture of the three kinds of flame retardants is used, an expandable char layer is formed through a synergy effect, thereby inhibiting the spread of oxygen and heat. Then, with the improvement of flame retardancy and flaming-drip, the flame retardancy of a thermoplastic polyurethane resin is significantly improved. In addition, when talc is further mixed with the composition, the flame retardancy is more improved, and thereby even a test sample with a thickness of 1 mm is capable of satisfying UL94 VO.

Especially, the problem of flaming-drip is solved by a flame retardancy synergy effect caused by using a mixture of one or two or more organic phosphorous flame retardants selected from the group including a phosphinate, a diphosphinate and a polymer thereof, dipentaerythritol, and a melamine-based flame retardant. Meanwhile, the use of phosphorous flame retardant in combination with a nitrogen compound. (compared to a phosphorous flame retardant alone) generates phosphoric acid amide through combustion, and thus forms an expandable char layer with increased thickness, thereby effectively inhibiting transfer of heat and oxygen required to material combustion. In addition, when talc is further mixed thereto, the heat and oxygen transfer inhibiting effect can be improved. In the present invention, one or two or more organic phosphorous flame retardants selected from the group including a phosphinate, a diphosphinate and a polymer thereof are preferably used in an amount of 0.5 to 15 percent by weight, and more preferably of 2 to 10 percent by weight. If the content is less than 0.5 percent by weight, it is impossible to solve a conventional problem of flaming-drip during combustion, and on the other hand, if the content is greater than 15 percent by weight, a mechanical property is significantly reduced.

Meanwhile, in the present invention, the melamine derivative is preferably used in an amount of 5 to 35 percent by weight, and more preferably of 15 to 30 percent by weight. If the content is less than 5 percent by weight, effective expendable char is not formed during combustion, thereby reducing flame retardancy. On the other hand, if the content is greater than 50 percent by weight a mechanical property is significantly reduced. In the case of dipentaerythritol, the content preferably ranges from 0.5 to 10 percent by weight, and more preferably from 2 to 8 percent by weight. If the content is less than 0.5 percent by weight, it is impossible to achieve high flame retardancy due to an insufficient formation of char, and on the other hand, if the content is greater than 10 percent by weight, a mechanical property is significantly reduced.

Also, in the present invention, talc is preferably used in an amount of 0.5 to 5 percent by weight, and more preferably of 1 to 4 percent by weight. If the content is less than 0.5 percent by weight, a flame retardancy improved effect is not achieved, and on the other hand, if the content is greater than 5 percent by weight, a mechanical property is significantly reduced.

A particle size of a flame retardant for improving flame retardancy of a plastic resin is very important because it has a great influence on physical properties of a final flame retardant resin. It is generally known that smaller the particle size is, the better physical properties and flame retardancy are. The particle size of the flame retardant preferably ranges from 1 to 60 μm, and more preferably ranges from 1 to 40 μm. Herein, the particle size greater than 60 μm is not preferable because it may cause a problem in dispersibility and also reduce flame retardancy.

In addition to, the above mentioned flame retardants, the flame retardant thermoplastic polyurethane of the present invention may further include at least one additive selected from the group including an antioxidant, a light stabilizer, a lubricant, a reinforcing agent a pigment, a colorant and a plasticizer. The additive may be used in a certain range which does not reduce physical properties of the resin according to the present invention.

The flame retardant thermoplastic polyurethane composite resin according to the present invention may be prepared by devices capable of effectively dispersing a flame retardant within a thermoplastic polyurethane resin at a temperature greater than a melting point of the thermoplastic polyurethane resin. In general, a thermoplastic polyurethane resin has a melting point ranging from 150 to 250° C., and the melting point depends on the thermoplastic polyurethane resin to be used. As a device for dispersing a flame retardant within a resin, a mixer (such as a banbury mixer), a roll-mill, a continuous kneader, a single screw extruder, a twin screw extruder, etc. may be used. In consideration of melt-kneading performance and productivity, the most preferable device is the twin screw extruder. Especially, through the use of elements for improving the melt-kneading performance of the twin screw extrude, that is, kneading elements and inverse-kneading elements, it is possible to achieve a more excellent effect.

In the present invention, a thermoplastic polyurethane resin and halogen-free flame retardants were melt-kneaded by using a twin screw extruder. Then, a melt output from an extruder die was cooled through a cooling tank, and then was prepared into a pellet. The resulting halogen-free flame retardant thermoplastic polyurethane composition was subjected to injection molding by using an injection machine, and sufficiently stabilized at room temperature. Finally, various kinds of mechanical properties and flame retardancy were tested.

As a result of the test, the flame retardant thermoplastic polyurethane composite resin composition according to the present invention showed high flame retardancy, significantly improved flaming-drip, and improved mechanical properties. Therefore, the composition is expected to be very useful for a wire insulator, car interior materials, etc.

Hereinafter, the present invention will be described in detail with reference to following Examples. However, the following examples are illustrative only, and the scope of the present invention is not limited thereto.

PREPARATION EXAMPLE

A thermoplastic polyurethane resin used in the present invention is a polyether-based thermoplastic polyurethane resin having a shore hardness of 85 A, which is obtained by introducing poly(tetramethylene ether)glycol (a number average molecular weight of 1000), 4,4'-methylenediphenyl-diisocyanate, and 1,4butanediol into a continuous reaction extruder (Werner & Pfleiderer ZSK 58 twin screw extruder), and polymerizing the mixture at 190 to 220° C. Herein, the extruder is mounted with a measuring device and has a kneading block whose size ranges 30% based on the total screw area. The thermoplastic polyurethane resin polymerized in the continuous reaction extruder was made into a pellet by a pelletizer, and was dried at 70° C. for 5 hours by using a dehumidifying dryer (Conair SC60, Inlet air dew point=−50° C.). Then, the thermoplastic polyurethane resin was dried at 70° C. for 15 hours, and was used for compounding with a flame retardant (NCO/OH=0.99; MW=250,000).

COMPARATIVE EXAMPLE 1

70 percent by weight of thermoplastic polyurethane resin, and 30 percent by weight of melamine cyanurate were melt-kneaded by a twin screw extruder at 170 to 200° C. Then, the melt output from the extruder die was cooled through a cooling tank, and was prepared into a pellet. From the obtained thermoplastic polyurethane composition, a test sample was made by using an injection machine, and was sufficiently stabilized. Next, on the sample, physical properties and flame retardancy were measured in accordance with following measuring methods. Table 1 shows the results.

COMPARATIVE EXAMPLE 2

A test sample was prepared by using 65 percent by weight of thermoplastic polyurethane resin, 25 percent by weight of melamine cyanurate, and 10 percent by weight of Exolit OP in the same manner as described in Comparative Example 1, and then was sufficiently stabilized. Next, on the sample, physical properties and flame retardancy were measured in accordance with following measuring methods. Table 1 shows the results.

COMPARATIVE EXAMPLE 3

A test sample was prepared by using 75 percent by weight of thermoplastic polyurethane resin, 20 percent by weight of melamine cyanurate, and 5 percent by weight of dipentaerythritol in the same manner as described in Comparative Example 1, and then was sufficiently stabilized. Next, on the sample, physical properties and flame retardancy were measured in accordance with following measuring methods. Table 1 shows the results.

COMPARATIVE EXAMPLE 4

A test sample was prepared by using 65 percent by weight of thermoplastic polyurethane resin, 20 percent by weight of melamine cyanurate, 10 percent by weight of Exolit OP, and 5 percent by weight of dipentaerythritol in the same manner as described in Comparative Example 1, and then was sufficiently stabilized. Next on the sample, physical properties and flame retardancy were measured in accordance with following measuring methods. Table 1 shows the results.

EXAMPLE 1

A test sample was prepared by using 60 percent by weight of thermoplastic polyurethane resin, 20 percent by weight of melamine cyanurate, 10 percent by weight of Exolit OP (Clarian), 5 percent by weight of dipentaerythritol, and 5 percent by weight of talc in the same manner as described in Comparative Example 1, and then was sufficiently stabilized. Next, on the sample, physical properties and flame retardancy were measured in accordance with following measuring methods. Table 1 shows the results.

EXAMPLE 2

A test sample was prepared by using 66 percent by weight of thermoplastic polyurethane resin, 20 percent by weight of melamine cyanurate, 7 percent by weight of Exolit OP (Clarian), 5 percent by weight of dipentaerythritol, and 2 percent by weight of talc in the same manner as described in Comparative Example 1, and then was sufficiently stabilized. Next, on the sample, physical properties and flame retardancy were measured in accordance, with following measuring methods. Table 1 shows the results.

EXAMPLE 3

A test sample was prepared by using 55 percent by weight of thermoplastic polyurethane resin, 30 percent by weight of melamine cyanurate, 7 percent by weight of Exolit OP (Clarian), 5 percent by weight of dipentaerythritol, and 3 percent by weight of talc in the same manner as described in Comparative Example 1, and then was sufficiently stabilized. Next, on the sample, physical properties and flame retardancy were measured in accordance with following measuring methods. Table 1 shows the results.

EXAMPLE 4

A test sample was prepared by using 60 percent by weight of thermoplastic polyurethane resin, 25 percent by weight of melamine cyanurate, 10 percent by weight of Exolit OP (Clarian), 7 percent by weight of dipentaerythritol, and 3 percent by weight of talc in the same manner as described in Comparative Example 1, and then was sufficiently stabilized. Next, on the sample, physical properties and flame retardancy were measured in accordance with following measuring methods. Table 1 shows the results.

EXPERIMENTAL EXAMPLE

The properties of thermoplastic polyurethane resin obtained from each of Examples 1 to 4 and Comparative Examples 1 to 4 were tested by the following methods.

Tensile Strength and Elongation

In accordance with ASTM D412, tensile strength and elongation at break were measured.

Flame Retardancy

In accordance with UL (Underwriter's Laboratory) 94 for a vertical burning test, flame retardancy on test samples (thickness: 3 mm, width: 12.7 mm, and length: 127 mm and thickness: 1 mm, width: 12.7 mm, and length: 127 mm) was measured. In the measurement, after burning the test sample by flame for 10 seconds, extinguishing time (t1) was recorded, and then after burning the test sample for 10 seconds again, extinguishing time (t2) was recorded. Herein, when the sum of t1 and t2 is not greater than 30 seconds, the rating is V1 or V2, and when the sum is less than 10 seconds, the rating is V0. Also, when absorbent cotton placed at the bottom is burned by flaming-drip, the rating is V2, whereas, when the cotton is not burned, the rating is V0 or V1. Also, during a UL 94 vertical burning test, the number of drippings was measured.

TABLE 1

| Composition (percent by weight) | | Comparative Examples | | | | Examples | | | |
|---|---|---|---|---|---|---|---|---|---|
| | | 1 | 2 | 3 | 4 | 1 | 2 | 3 | 4 |
| TPU | TPU | 70 | 65 | 75 | 65 | 60 | 66 | 55 | 55 |
| Flame retardant | MCv | 30 | 25 | 20 | 20 | 20 | 20 | 30 | 25 |
| | Exolit OP | — | 10 | — | 10 | 10 | 7 | 7 | 10 |
| | Dipentaerythritol | — | — | 5 | 5 | 5 | 5 | 5 | 7 |
| | Talc | — | — | — | — | 5 | 2 | 3 | 3 |
| Physical property | Tensile strength (kgf/cm$^2$) | 115 | 90 | 102 | 85 | 85 | 92 | 80 | 88 |
| | Elongation (%) | 244 | 197 | 224 | 190 | 185 | 204 | 168 | 182 |
| Flame retardancy | Thickness 3 mm | V2 | V0 | V0 | V0 | V0 | V0 | V0 | V0 |
| | Number of drippings | 4 | 0 | 0 | 0 | 0 | 0 | 0 | 0 |
| | Thickness 1 mm | V2 | V2 | V2 | V2 | V0 | V0 | V0 | V0 |
| | Number of drippings | 5 | 3 | 3 | 1 | 0 | 0 | 0 | 0 |

TPU: polyester-based thermoplastic polyurethane resin (hardness: 87A), commercially available from SK Chemical
MCy: melamine cyanurate, commercially available from Budenheim, particle size: 30 μm
Dipentaerythritol: commercially available from Perstopr, particle size: 40 μm
Exolit OP: particle size: 40 μm
Talc: commercially available from Rexm, particle size: 30 μm As noted in Table 1, as compared to halogen-free flame retardant thermoplastic polyurethane composite resin compositions from Comparative Examples 1 to 4, halogen-free flame retardant thermoplastic polyurethane composite resin compositions from Examples 1 to 4 showed high flame retardancy (the rating of V0, even with a thickness of 1 mm) and improved flaming-drip during combustion.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A halogen-free flame retardant thermoplastic polyurethane composite resin composition comprising:

(a) 35 to 85 percent by weight of thermoplastic polyurethane resin having an equivalent ratio of a diisocyanate to an alcohol group included in diol and polyol in a range from 0.95 to 1.10;

(b) a flame retardant package comprising;

0.5 to 15 percent by weight of organic phosphorus flame retardant;

0.5 to 10 percent by weight of dipentaerythritol;

0.5 to 5 percent weight of talc; and 5 to 35 percent by weight of melamine derivative, wherein the flame retardant particle size ranges from 1 to 60 μm, resulting in a composition with improved flame retardancy.

2. The composition as claimed in claim 1, wherein the polyol is polyester polyol or polyether polyol, and has a molecular weight ranging from 500 to 8000.

3. The composition as claimed in claim 1, wherein the thermoplastic polyurethane resin has an average molecular weight ranging from 100,000 to 700,000.

4. The composition as claimed in claim 1, wherein the organic phosphorous flame retardant is one or two or more mixtures selected from the group including a phosphinate, a diphosphinate and a polymer thereof.

5. The composition as claimed in claim 4, wherein the phosphinate is represented by Formula 1, and the diphosphinate is represented by Formula 2:

[Formula 1]

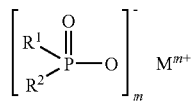

-continued

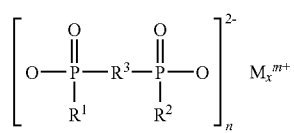

[Formula 2]

wherein each of $R^1$ and $R^2$ represents C1 to C6 alkyl, for example, methyl, ethyl, n-propyl, isopropyl, n-butyl, t-butyl, n-pentyl, or phenyl; $R^3$ represents linear or branched chain C1 to C10 alkylene (for example: methylene, ethylene, n-propylene, isopropylene, n-butylene, tertiary butylene, n-pentylene, n-octylene, or n-dodecylene), C6 to C10 arylene (for example, phenylene or naphthylene), C6 to C10 alkylarylene (for example, methylphenylene, ethylphenylene, tertiary butylphenylene, methylnaphthylene, ethylnaphthylene, tertiary butylnaphthylene) or C6 to C10 arylalkylene (for example: phenylmethylene, phenylethylene, phenylpropylene or phenylbutylene); M represents calcium, aluminum or zinc; m represents 2 or 3; n represents 1 or 3; and x represents 1 or 2.

6. The composition as claimed in claim 1, wherein the melamine derivative is selected from the group including melamine cyanurate, melamine phosphate, melamine polyphosphate, and melamine borate.

7. The composition as claimed in claim 1, wherein the thermoplastic polyurethane resin is included in an amount of 50 to 70 percent by weight.

8. The composition as claimed in claim 1, wherein the organic phosphorous flame retardant is included in an amount of 2 to 10 percent by weight.

9. The composition as claimed in claim 1, wherein the melamine derivative is included in an amount of 15 to 30 percent by weight.

10. The composition as claimed in claim 1, wherein the dipentaerythritol is included in an amount of 2 to 8 percent by weight.

11. The composition as claimed in claim 1, wherein the talc is included in an amount of 1 to 4 percent by weight.

\* \* \* \* \*